US012571571B2

(12) United States Patent
Sishtla et al.

(10) Patent No.: US 12,571,571 B2
(45) Date of Patent: Mar. 10, 2026

(54) MAGNETIC BEARING LEVITATION CONTROL

(71) Applicant: Carrier Corporation, Palm Beach Gardens, FL (US)

(72) Inventors: Vishnu Sishtla, Syracuse, NY (US); Scott A. Nieforth, Clay, NY (US); Biswajit Mitra, Huntersville, NC (US); Macey Parrott, Charlotte, NC (US); Puja Chopra, Mooresville, NC (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 164 days.

(21) Appl. No.: 17/823,832

(22) Filed: Aug. 31, 2022

(65) Prior Publication Data

US 2024/0068725 A1 Feb. 29, 2024

(51) Int. Cl.
*F25B 49/02* (2006.01)
*F16C 32/04* (2006.01)

(52) U.S. Cl.
CPC ........ *F25B 49/022* (2013.01); *F16C 32/0474* (2013.01)

(58) Field of Classification Search
CPC ........................... F25B 49/022; F16C 32/0474
See application file for complete search history.

(56) References Cited

U.S. PATENT DOCUMENTS 9,583,991 B2 2/2017 Iannello et al.
10,808,711 B2 10/2020 Lee et al.

2006/0055259 A1 3/2006 Hanlon et al.
2009/0084119 A1 4/2009 Lifson et al.
2014/0241909 A1* 8/2014 Perevozchikov ..... F04C 23/001
417/244
2017/0241442 A1* 8/2017 Groshek ................. F25B 49/02
2018/0347879 A1* 12/2018 Tada ...................... F04B 49/10
(Continued)

FOREIGN PATENT DOCUMENTS

CN 109855338 A * 6/2019
CN 107646078 B 1/2020
(Continued)

OTHER PUBLICATIONS

Liu, Air-cooling magnetic suspended centrifugal unit and its halt control method, 2019, Full Document (Year: 2019).*
(Continued)

*Primary Examiner* — Nael N Babaa
(74) *Attorney, Agent, or Firm* — Drew Folgmann

(57) ABSTRACT

A vapor compression system and method for operating the vapor compression system are provided. The vapor compression system includes a compressor, a condenser, and at least one check valve disposed between the compressor and the condenser. The method provides for the transmitting of a shutdown command to the compressor, the compressor including a rotating shaft and a magnetic bearing, the magnetic bearing having an active mode and an inactive mode, the magnetic bearing levitating the rotating shaft in the active mode. The method further provides for the maintaining of the magnetic bearing in the active mode during a minimum time period, the magnetic bearing switching from the active mode to the inactive mode after the minimum time period is reached.

20 Claims, 4 Drawing Sheets

900

(56)  References Cited

U.S. PATENT DOCUMENTS

| | | |
|---|---|---|
| 2019/0120290 A1 | 4/2019 | Jung et al. |
| 2020/0096220 A1* | 3/2020 | Nakazawa .............. H02P 5/747 |
| 2022/0011026 A1 | 1/2022 | Sishtla et al. |

FOREIGN PATENT DOCUMENTS

| | | | |
|---|---|---|---|
| CN | 111220061 A | 6/2020 | |
| CN | 111442029 A | 7/2020 | |
| CN | 112729186 A | 4/2021 | |
| CN | 110649841 B | 5/2021 | |
| JP | 07127594 A | 5/1995 | |
| JP | 2993111 B2 | 12/1999 | |
| JP | 4732468 B2 | 7/2011 | |
| WO | 2001086159 A1 | 11/2001 | |
| WO | 2001098676 A2 | 12/2001 | |
| WO | WO-2020164279 A1 * | 8/2020 | |

OTHER PUBLICATIONS

Liu, Air-Cooled Magnetic Suspension Centrifuge Set and Shutdown Control Method Thereof, 2020, Full Document (Year: 2020).*
Extended European Search Report received for EP Application No. 21179315.3, mailed on Nov. 5, 2021, 05 Pages.

* cited by examiner

MAGNETIC BEARING LEVITATION CONTROL

BACKGROUND

Vapor compression systems (e.g., chillers) commonly include at least one compressor, a condenser, an expansion valve, and an evaporator. Refrigerant circulates through the vapor compression system in order to provide cooling to a medium (e.g., air). The refrigerant exits the compressor(s) through the discharge port(s) at a high pressure and a high enthalpy. The refrigerant then flows through the condenser at a high pressure and rejects heat to an external fluid medium. The refrigerant then flows through the expansion valve, which expands the refrigerant to a low pressure. After expansion, the refrigerant flows through the evaporator and absorbs heat from another medium (e.g., air). The refrigerant then re-enters the compressor(s) through the suction port(s), completing the cycle.

Compressors commonly include a motor rotor and a motor stator housed within a compressor housing. The rotor is fixed to and rotates with a rotating shaft, and the stator is fixed inside the compressor housing. Depending on the type of compressor, magnetic bearings may be used to levitate the rotating shaft while the compressor is operational. Touchdown bearings are commonly used by compressors with magnetic bearings to provide for smooth rotation of the shaft and protect the rotor when the compressor is shutdown. The touchdown bearings can be in the form of ball bearings or sleeve bearings. These touchdown bearings have potential to become damaged if the rotating shaft is placed on the touchdown bearings while the rotating shaft is still rotating, as the touchdown bearings are traditionally not lubricated.

Accordingly, there remains a need for a way to prevent or at least mitigate the rotating shaft of a compressor being shutdown from being placed on the touchdown bearings while still rotating.

BRIEF DESCRIPTION

According to one embodiment, a method of operating a vapor compression system including a compressor, a condenser, and at least one check valve disposed between the condenser and the compressor is provided. The method includes a step for transmitting a shutdown command to the compressor, the compressor including a rotating shaft and a magnetic bearing, the magnetic bearing having an active mode and an inactive mode, the magnetic bearing levitating the rotating shaft in the active mode. The method includes a step for maintaining the magnetic bearing in the active mode during a minimum time period, the magnetic bearing switching from the active mode to the inactive mode after the minimum time period is reached.

In accordance with additional or alternative embodiments, the minimum time period is at least twenty (20) seconds after the shutdown command is transmitted.

In accordance with additional or alternative embodiments, the minimum time period is determined as a function of at least one of: a baseline coast down time, a temperature difference between the evaporator and the condenser when the shutdown command is transmitted, position of at least one inlet guide vane when the shutdown command is transmitted, and a variable frequency drive (VFD) speed when the shutdown command is transmitted.

In accordance with additional or alternative embodiments, the method further includes a step for monitoring a rotational speed of the rotating shaft during the minimum time period.

In accordance with additional or alternative embodiments, the minimum time period is learned by evaluating an amount of time it takes the rotating shaft to reach an acceptable threshold following the transmission of at least two (2) different shutdown commands.

In accordance with additional or alternative embodiments, the acceptable threshold is less than one-hundred (100) rotations per minute (RPM).

In accordance with additional or alternative embodiments, the method further includes a step for determining a sensor malfunction when the rotating speed of the rotating shaft does not reach the acceptable threshold during the minimum time period.

In accordance with additional or alternative embodiments, the vapor compression system is devoid of a sensor capable of monitoring a rotational speed of the rotating shaft during the minimum time period.

In accordance with additional or alternative embodiments, the vapor compression system includes a first compressor and a second compressor, at least one of the first compressor and the second compressor includes a rotating shaft and a magnetic bearing.

According to another aspect of the disclosure, a vapor compression system including a condenser, a compressor, a check valve, and a controller is provided. The condenser transfers heat from a working fluid to an external fluid medium. The compressor is in fluid communication with the condenser. The compressor includes an electric motor, a magnetic bearing, and a touchdown bearing. The electric motor drives a rotating shaft. The magnetic bearing levitates the rotating shaft when in an active mode. The magnetic bearing is disposed adjacent to the electric motor. The touchdown bearing is configured to rotate and support the rotating shaft when the magnetic bearing is in an inactive mode. The touchdown bearing is disposed adjacent to the rotating shaft. The check valve is in fluid communication with the condenser and the compressor. The controller is configured to control the compressor. The controller is configured to receive a shutdown command for the compressor. The controller maintains the magnetic bearing in the active mode during a minimum time period. The magnetic bearing switches from the active mode to the inactive mode after the minimum time period is reached.

In accordance with additional or alternative embodiments, the minimum time period is at least twenty (20) seconds after the shutdown command is transmitted.

In accordance with additional or alternative embodiments, the minimum time period is determined as a function of at least one of: a baseline coast down time, a temperature difference between the evaporator and the condenser when the shutdown command is transmitted, position of at least one inlet guide vane when the shutdown command is transmitted, and a VFD speed when the shutdown command is transmitted.

In accordance with additional or alternative embodiments, the vapor compression system further includes at least one sensor disposed within the compressor, the at least on sensor in communication with the controller, the at least one sensor configured to monitor the rotational speed of the rotating shaft during the minimum time period.

In accordance with additional or alternative embodiments, the minimum time period is learned by the controller through evaluating an amount of time it takes the rotating shaft to reach an acceptable threshold following the transmission of at least two (2) different shutdown commands.

In accordance with additional or alternative embodiments, the acceptable threshold is less than one-hundred (100) RPMs.

In accordance with additional or alternative embodiments, the vapor compression system is configured to determine a sensor malfunction when the rotating speed of the rotating shaft does not reach the acceptable threshold during the minimum time period.

In accordance with additional or alternative embodiments, the vapor compression system is devoid of a sensor capable of monitoring a rotational speed of the rotating shaft during the minimum time period.

In accordance with additional or alternative embodiments, the vapor compression system includes a first compressor and a second compressor, at least one of the first compressor and the second compressor includes a rotating shaft and magnetic bearing, the controller configured to receive a shutdown command for at least one of the first compressor and the second compressor.

In accordance with additional or alternative embodiments, the external fluid medium is at least one of: an air supply and a water supply.

In accordance with additional or alternative embodiments, the working fluid is a refrigerant.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike.

DETAILED DESCRIPTION

As will be described below, a vapor compression system capable of preventing or at least mitigating a rotating shaft from being placed on the touchdown bearings while still rotating, and a method of operating the vapor compression system in such a manner are provided. The vapor compression system described herein includes at least one compressor with a magnetic bearing for levitating the rotating shaft of the compressor. In certain embodiments the vapor compression system may include multiple compressors (e.g., a first compressor and a second compressor). Depending on the load requirements, one of the compressors may be shutdown while the other compressor remains operational. For example, at part load operation, the first compressor may be shutdown while the second compressor may remain operational. To stop backflow of the working fluid (e.g., a refrigerant) and pressure from the operational compressor (e.g., the second compressor) into the compressor (e.g., the first compressor) being shutdown a check valve may be used.

To ensure that the rotating shaft is not placed on the touchdown bearings while still rotating the vapor compression system described herein may include at least one speed sensor to monitor the rotational speed of the rotating shaft after a compressor is shutdown, keeping the magnetic bearings in an active mode (i.e., where rotating shaft is levitated) until the rotational speed is below an acceptable threshold (e.g., 100 RPMs) in certain instances. However, in certain instances, the vapor compression system described herein may remove the need of a speed sensor. For example, instead of relying on a speed sensor to determine the rotational speed, the vapor compression system may wait for a minimum time period after shutdown before switching the magnetic bearings to an inactive mode (i.e., where the rotating shaft is no longer levitated). It should be appreciated that in certain instances the vapor compression system may include a speed sensor while also relying on a minimum time period to determine when to switch the magnetic bearings from active mode to inactive mode.

Figure 1A:
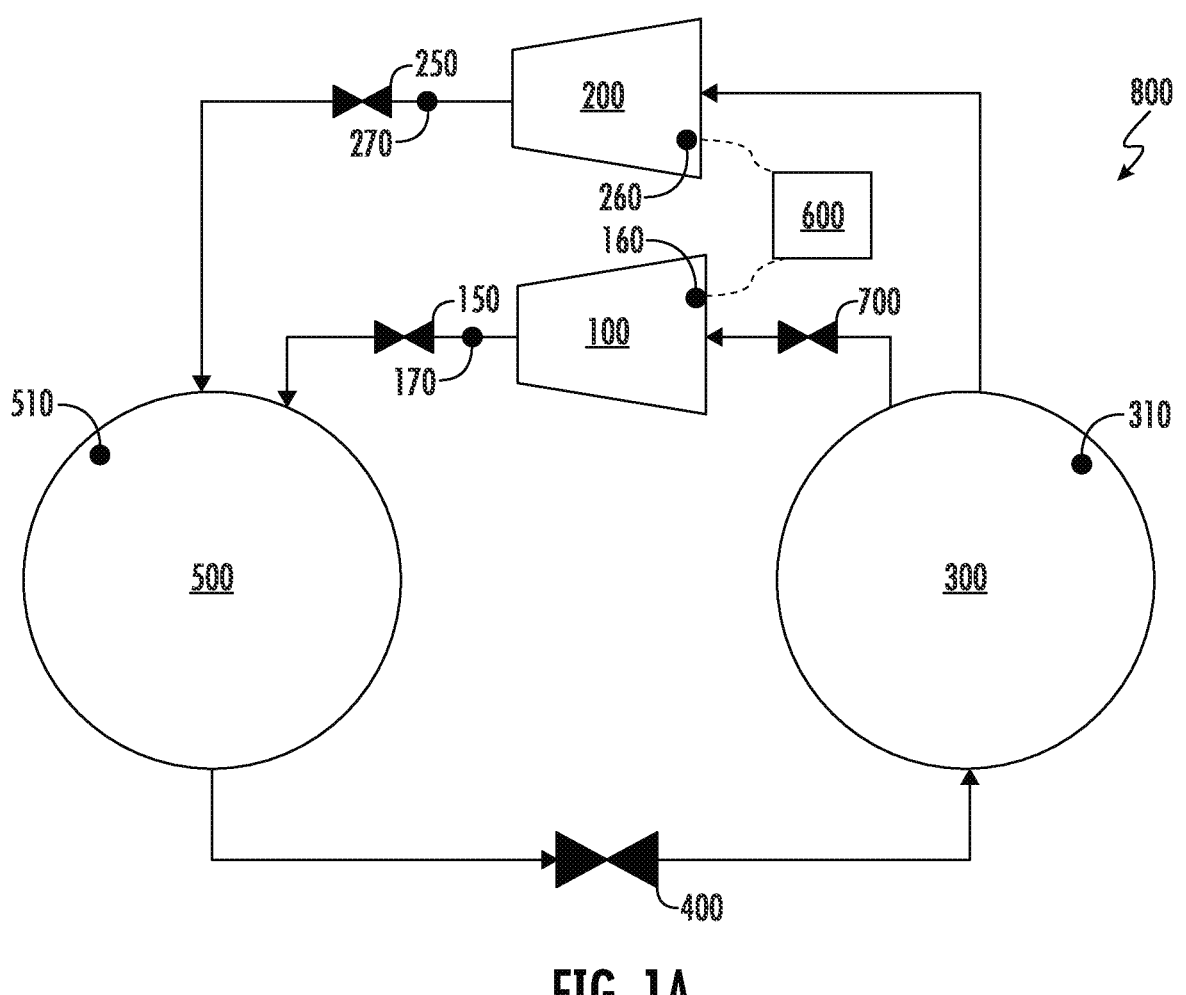
FIG. 1A is a schematic illustration of an exemplary vapor compression system including a condenser, a first compressor, and a second compressor, with a controller configured to control at least one of the first compressor and the second compressor, in accordance with one aspect of the disclosure.
Figure 1B:
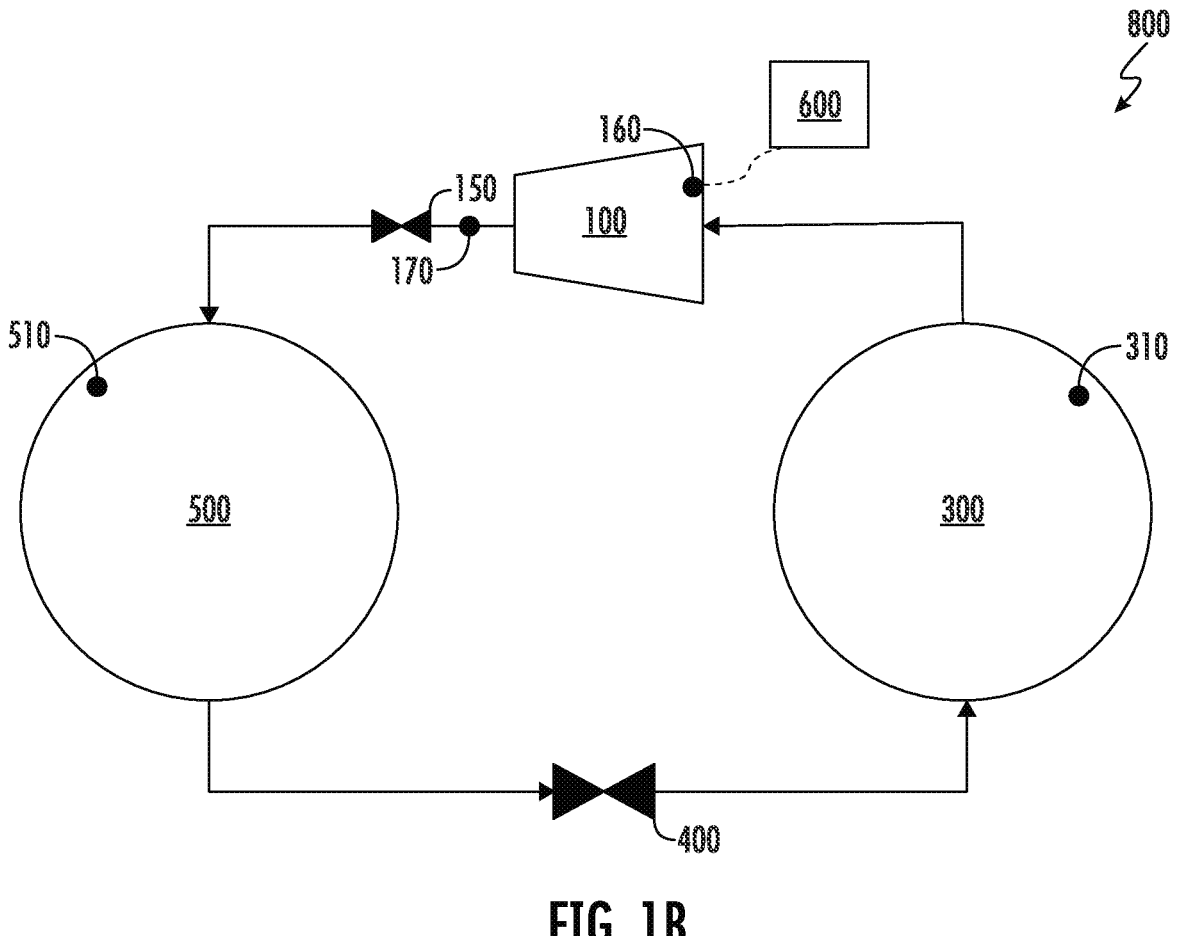
FIG. 1B is a schematic illustration of an exemplary vapor compression system including a condenser and a compressor, with a controller configured to control the compressor, in accordance with one aspect of the disclosure.

With reference now to the Figures, a schematic illustration of an exemplary vapor compression system 800 including a condenser 500, a first compressor 100, and a second compressor 200 is shown in FIG. 1A. As described above and shown in FIG. 1B, the vapor compression system 800 may include a single compressor in certain instances (which may include multiple stages in certain instances). It should be appreciated that the vapor compression system 800 may include any system (e.g., a chiller, etc.) with a condenser 500 and at least one compressor 100, which includes a rotating shaft 140 (shown in FIG. 2). As shown in FIGS. 1A and 1B the vapor compression system 800 includes a controller 600 configured to control at least one compressor 100, 200. As shown in FIGS. 1A and 1B, the vapor compression system 800 may include a compressor 100, a condenser 500, an expansion valve 400, and an evaporator 300. The vapor compression system 800 may be configured to circulate a working fluid (e.g., a refrigerant such as R-134A) through the vapor compression system 800 to provide cooling to a medium (e.g., air, water, etc.). Although R-134A is mentioned, it will be appreciated that other types of refrigerant may be used.

As mentioned above, at times, the vapor compression system 800 may need to provide for a higher cooling capacity (which requires a higher compressed refrigerant flow), and at other time, a lower cooling capacity (which requires a lower compressed refrigerant flow). To provide continuous efficient supply of the desired amount of compressed refrigerant, the vapor compression system 800 may include multiple compressors 100, 200 (which may be referred to as a first compressor 100 and a second compressor 200). These compressors may be duplicates of the same compressor (e.g., being of the same size and configuration), or may be different (e.g., either sized differently or have different configurations). It is envisioned that at least one compressor (e.g., the first compressor 100) within the vapor compression system 800 includes a magnetic bearing 110, a touchdown bearing 120, and a rotating shaft 140 (shown in FIG. 2), which may be controlled by the controller 600 to keep the magnetic bearing in an active mode for a minimum time period after the shutdown command is transmitted.

Figure 2:
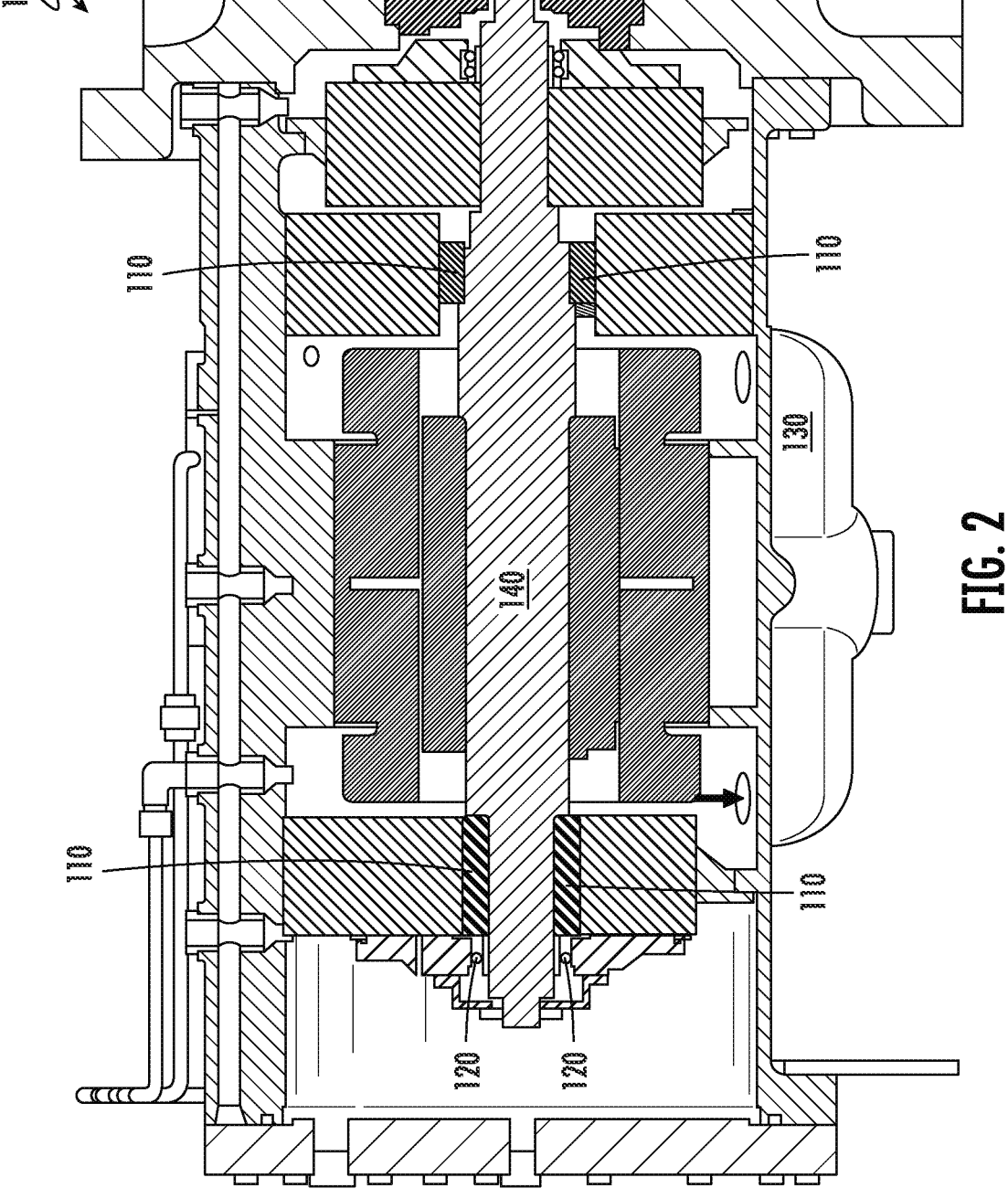
FIG. 2 is a cross-sectional side view of a compressor, such as the first compressor shown in FIG. 1, depicting touchdown bearings disposed adjacent to a rotating shaft, in accordance with one aspect of the disclosure.

FIG. 2, depicts a cross-sectional side view of a compressor (e.g., which may be viewed as the first compressor 100 shown in FIG. 1A). Although not shown in FIG. 2, it should be appreciated that the second compressor 200 (when present) may be configured in the same manner as the first compressor 100. As shown in FIG. 2, the compressor 100 includes an electric motor 130, a magnetic bearing 110, and a touchdown bearing 120. The electric motor 130 is used for driving a rotating shaft 140. The magnetic bearing 110 is used for levitating the rotating shaft 140 when in an active mode (e.g., at least when the compressor 100 is operational). The compressor 100 may be viewed as operational when the compressor 100 is generating a positive pressure to force working fluid through the vapor compression system 800. It should be appreciated that the magnetic bearing 110 includes both an active mode (e.g., when generating a magnetic field for levitating the rotating shaft 140) and an inactive mode (e.g., when not generating a magnetic field). The magnetic bearing 110 is disposed adjacent to the electric motor 130. The touchdown bearing 120 is used for supporting the rotating shaft 140 when the magnetic bearing 110 is in an inactive mode. The touchdown bearing 120 is disposed adjacent to the rotating shaft 140.

As described above, the vapor compression system 800 may include a check valve 150, 250 (shown in FIGS. 1A and 1B) in fluid communication with the respective compressor(s) 100, 200 and the condenser 500. This check valve 150, 250 may help to stop backflow of the working fluid second compressor 200 (e.g., when the second compressor 200 is operational) into the first compressor 100 when the first compressor 100 is being shutdown (e.g., when the vapor compression system 800 is operated at part load). This check valve 150 may also help to ensure the rotating shaft 140 of the first compressor 100 can stop rotating when the first compressor 100 is shutdown. As shown, in certain instances, both the first compressor 100 and the second compressor 200 may include check valves 150, 250, respectively.

To control at least one compressor 100, 200, the vapor compression system 800 may include a controller 600 (shown in FIGS. 1A and 1B). The controller 600 may be configured to receive a shutdown command for the at least one compressor 100, 200 (e.g., when part load operation is needed, etc.). It should be appreciated that the shutdown command may automatically be generated based on the input from one or more sensors (described below). The controller 600 may be in communication with at least one sensor for monitoring at least one of a rotational speed of the rotating shaft 140 (shown in FIG. 2). The controller 600 may help prevent the rotating shaft 140 from being placed on the touchdown bearings 120 when the rotating shaft 140 is still rotating by maintaining the magnetic bearings 110 of at least one compressor 100, 200 in an active mode at least during a minimum time period. This minimum time period, in certain instances, is at least than twenty (20) seconds after the shutdown command is transmitted to and/or generated by the controller 600. For example, the preset time may be between twenty (20) and one-hundred and twenty (120) seconds after the compressor 100, 200 is shutdown. It should be appreciated that other minimum time periods may be suitable in certain instances.

It will be appreciated that the minimum time period may be dependent on the operation and/or condition of the vapor compression system 800. For example, the minimum time period may be determined as a function of at least one of: a baseline coast down time (e.g., the nominal coast down time observed for the type of compressors being used with check valves and no bypass), a temperature difference between the evaporator and the condenser when the shutdown command is transmitted (which may be referred to as a SAT factor), the position of at least one inlet guide vane (IGV) when the shutdown command is transmitted (which may be referred to as an IGV factor), and a VFD speed with the shutdown command is transmitted (which may be referred to as a VFD speed factor). It will be appreciated that the inlet guide vanes may include any number vanes positioned at the inlet of the compressor 100, 200 capable of rotating to control the flow of working fluid into the respective compressor 100, 200. An exemplary calculation for the calculation of the minimum time period is provided by the following formula, where minimum time period=baseline coast down time+SAT factor+IGV factor+VFD speed factor. Each of these factors are further described in the below table. The values of which are meant as exemplary and may vary dependent on the particular components used and/or configuration of the vapor compression system 800.

| Variable Name | Default (seconds) | Configuration Range (seconds) | Equation for Adjustment of Minimum Time |
|---|---|---|---|
| Baseline Coast Down Time | 60 | 50-90 | Baseline Time |
| SAT Factor | 3 | 0-10 | -(SAT Factor)*(1-((Actual Lift at Power Removal)(F) − 17)/43) |
| IGV Factor | 3 | 0-10 | -(IGV Factor)*(1-(Actual IGV at Shutdown(%)/94.7)) |
| VFD Speed Factor | 3 | 0-10 | -(VFD Speed Factor)*(1-(Actual VFD Speed(%)/100) |

In certain instances the learned (e.g., using machine learning, artificial intelligence, etc.) by evaluating the amount of time it takes the rotating shaft to reach an acceptable threshold following the transmission of at least two (2) different shutdown commands (e.g., using one or more speed sensor, etc.). For example, the controller 600 may be configured to adjust the minimum time period based upon observed variables over the life of the vapor compression system. It should be appreciated that the minimum time period may vary due to normal wear and tear of the components during operation. In certain instances the controller 600 may determine a sensor malfunction when the rotating shaft does not reach the acceptable threshold during the minimum time period. This malfunction may be communicated via an alarm, notification, etc. to encourage maintenance/replacement of the speed sensor(s).

The controller 600, in certain instances, may be viewed as a programmable logic controller (PLC) or programmable controller, capable of receiving inputs and outputs from one or more sensors (described below), and may include a processor (e.g., a microprocessor) and a memory for storing the programs to control components of the vapor compression system 800 (e.g., the operation of the compressor(s) 100, 200). The memory may include any one or combination of volatile memory elements (e.g., random access memory (RAM), non-volatile memory elements (e.g., ROM, etc.)), and/or have a distributed architecture (e.g., where various components are situated remotely from one another, but can be accessed by the processor). The controller 600 may be configured to switch the magnetic bearing 110 from the active mode to the inactive mode (e.g., when the minimum time period is reached and/or when the rotational speed of the rotating shaft 140 reaches an acceptable threshold). An acceptable threshold may be less than 100 RPMs. For example, when the compressor 100 is shutdown, the controller 600 may maintain the magnetic bearing 110 in an active mode (e.g., to keep the rotating shaft 140 levitated) until the rotating shaft 140 is rotating at less than 100 RPMs. This may be determined by relying on the minimum time period (which may be calculated using the above formula and/or determined by monitoring the rotational speed during past shutdowns, using one or more speed sensor, etc.).

To monitor the rotational speed of the rotating shaft 140 the controller 600 may be in communication with at least one sensor. In certain instances, the sensor is a rotational sensor 160 disposed in the compressor 100. It should be appreciated that the controller 600 may also be in communication with a rotational sensor 260 disposed in additional compressors (e.g., the second compressor 200). The rotational sensor 160, 260 may include any technology capable of determining whether a rotating shaft 140 is rotating and/or at what RPM. For example, the rotational sensor 160, 260 may be a torque sensor or a transducer which convert torque into an electrical signal, which may be transmitted (e.g., through one or more wired or wireless connections) to the controller 600.

When including multiple compressors 100, 200, the vapor compression system 800 may include an isolation valve 700 upstream and/or downstream of the first compressor 100 to protect the first compressor 100 in the event of a failed check valve 150. This isolation valve 700 may be configured to prevent the flow of the working fluid into the first compressor 100. This isolation valve 700, in certain instances, is a solenoid valve, which may be in communication with the controller 600. For example, the controller 600 may be configured to close the isolation valve 700 when the rotational speed of the rotating shaft 140 in the first compressor 100 does not reach an acceptable threshold within the minimum time period. Once closed, the isolation valve 700 should allow the rotating shaft 140 of the first compressor 100 to slow down below the acceptable threshold. It should be appreciated that the controller 600 may maintain the magnetic bearing 110 in an active mode (e.g., to keep the rotating shaft 140 levitated) until the rotating shaft 140 is rotating at less than the acceptable threshold (e.g., 100 RPMs).

Figure 3:
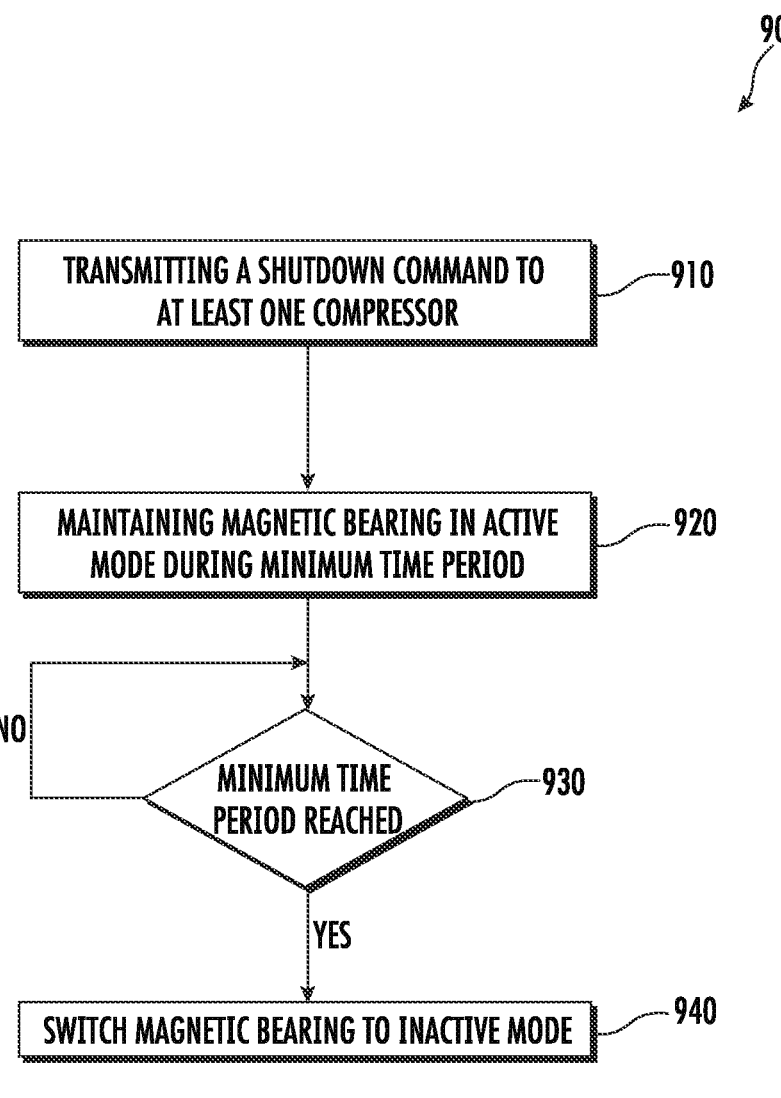
FIG. 3 is a flow diagram illustrating a method of operating a vapor compression system including a compressor, a condenser, and a check valve disposed between the condenser and the compressor, in accordance with one aspect of the disclosure.

This method of operating the vapor compression system 800 may help prevent, or at least mitigate, the touchdown bearings 120 of a compressor (e.g., the first compressor 100) being shutdown from becoming damaged. This method 900 may be completed by a controller 600 (e.g., such as the controller 600 described above). This method 900 is illustrated in FIG. 3. The method 900 may be performed, for example, using the exemplary vapor compression system 800 shown in FIGS. 1A and/or 1B, which may include the exemplary compressor 100 shown in FIG. 2. As shown in FIGS. 1A and 1B, the vapor compression system may include a compressor 100, a condenser 500, and at least one check valve 150 disposed between the compressor 100 and the condenser 500. The method 900 provides step 910 of transmitting a shutdown command to the compressor 100. The compressor 100 including a rotating shaft 140 and a magnetic bearing 110. The magnetic bearing 110 including an active mode and an inactive mode. The magnetic bearing 110 configured to levitate the rotating shaft 140 in the active mode.

The method 900 provides step 910 of transmitting a shutdown command to the compressor 100. The method 900 further provides step 920 of maintaining the magnetic bearing in the active mode during the minimum time period (described above). As shown in FIG. 3, the method provides step 930 of determining whether the minimum time period has been reached. Once reached, the method provides step 940 of switching the magnetic bearing 110 from the active mode to the inactive mode (e.g., to no longer levitate the rotating shaft 140). In certain instances the method provide for the monitoring of the rotational speed of the rotating shaft during the minimum time period. This monitoring of the rotating shaft during multiple shutdowns may enable the adjustment of the minimum time period (e.g., to reduce the time between shutdown and startup, while ensuring that the rotating shaft is levitated until at or below an acceptable threshold).

The use of the terms "a" and "and" and "the" and similar referents, in the context of describing the invention, are to be construed to cover both the singular and the plural, unless otherwise indicated herein or cleared contradicted by context. The use of any and all example, or exemplary language (e.g., "such as", "e.g.", "for example", etc.) provided herein is intended merely to better illuminate the invention and does not pose a limitation on the scope of the invention unless otherwise claimed. No language in the specification should be construed as indicating any non-claimed elements as essential to the practice of the invention.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating a vapor compression system comprising a compressor, a condenser, and at least one check valve disposed between the condenser and the compressor, the method comprising:

transmitting a shutdown command to the compressor, the compressor comprising a rotating shaft and a magnetic bearing, the magnetic bearing comprising an active mode and an inactive mode, the magnetic bearing levitating the rotating shaft in the active mode; and maintaining the magnetic bearing in the active mode during a minimum time period, the magnetic bearing switching from the active mode to the inactive mode after the minimum time period is reached, wherein the minimum time period is determined automatically based on input from at least one speed sensor.

2. The method of claim 1, wherein the minimum time period is at least twenty seconds after the shutdown command is transmitted.

3. The method of claim 1, wherein the minimum time period is determined as a function of at least one of: a baseline coast down time, a temperature difference between an evaporator and the condenser when the shutdown command is transmitted, position of at least one inlet guide vane when the shutdown command is transmitted, and a Variable Frequency Drive (VFD) speed when the shutdown command is transmitted.

4. The method of claim 1, further comprising monitoring, via the at least one speed sensor a rotational speed of the rotating shaft during the minimum time period, and maintaining the magnetic bearing in the active mode, until the monitored rotational speed drops below an acceptable threshold.

5. The method of claim 4, wherein the minimum time period is learned by evaluating an amount of time it takes the rotating shaft to reach the acceptable threshold following the transmission of at least two different shutdown commands.

6. The method of claim 5, wherein the acceptable threshold is less than one-hundred RPMs.

7. The method of claim 4, further comprising determining a sensor malfunction when the rotational speed of the rotating shaft does not reach the acceptable threshold during the minimum time period.

8. The method of claim 1, wherein the vapor compression system is devoid of a sensor capable of monitoring a rotational speed of the rotating shaft during the minimum time period.

9. The method of claim 1, wherein the vapor compression system comprises a first compressor and a second compressor, at least one of the first compressor and the second compressor comprising a rotating shaft and a magnetic bearing.

10. A vapor compression system comprising:
a condenser for transferring heat from a working fluid to an external fluid medium;
a compressor in fluid communication with the condenser, the compressor comprising:
an electric motor for driving a rotating shaft;
a magnetic bearing for levitating the rotating shaft when in an active mode, the magnetic bearing disposed adjacent to the electric motor; and
a touchdown bearing configured to rotate and support the rotating shaft when the magnetic bearing is in an inactive mode, the touchdown bearing disposed directly adjacent to the rotating shaft;
a check valve in fluid communication with the condenser and the compressor; and
a controller configured to control the compressor, the controller configured to receive a shutdown command for the compressor, wherein the controller maintains the magnetic bearing in the active mode during a minimum time period, the magnetic bearing switching from the active mode to the inactive mode after the minimum time period is reached, wherein the minimum time period is determined automatically based on input from at least one speed sensor.

11. The vapor compression system of claim 10, wherein the minimum time period is at least twenty seconds after the shutdown command is transmitted.

12. The vapor compression system of claim 10, wherein the minimum time period is determined as a function of at least one of: a baseline coast down time, a temperature difference between an evaporator and the condenser when the shutdown command is transmitted, position of at least one inlet guide vane when the shutdown command is transmitted, and a Variable Frequency Drive (VFD) speed when the shutdown command is transmitted.

13. The vapor compression system of claim 10, further comprising the at least one speed sensor disposed within the compressor, the at least one speed sensor in communication with the controller, the at least one speed sensor configured to monitor a rotational speed of the rotating shaft during the minimum time period.

14. The vapor compression system of claim 13, wherein the minimum time period is learned by the controller through evaluating an amount of time it takes the rotating shaft to reach an acceptable threshold following the transmission of at least two different shutdown commands.

15. The vapor compression system of claim 14, wherein the acceptable threshold is less than one-hundred RPM s.

16. The vapor compression system of claim 13, wherein the vapor compression system is configured to determine a sensor malfunction when the rotational speed of the rotating shaft does not reach an acceptable threshold during the minimum time period.

17. The vapor compression system of claim 10, wherein the vapor compression system is devoid of a sensor capable of monitoring a rotational speed of the rotating shaft during the minimum time period.

18. The vapor compression system of claim 10, wherein the vapor compression system comprises a first compressor and a second compressor, at least one of the first compressor and the second compressor comprising a rotating shaft and magnetic bearing, the controller configured to receive a shutdown command for at least one of the first compressor and the second compressor.

19. The vapor compression system of claim 10, wherein the external fluid medium is comprised of at least one of: an air supply and a water supply.

20. The vapor compression system of claim 10, wherein the working fluid is a refrigerant.

* * * * *